Patented Feb. 6, 1923.

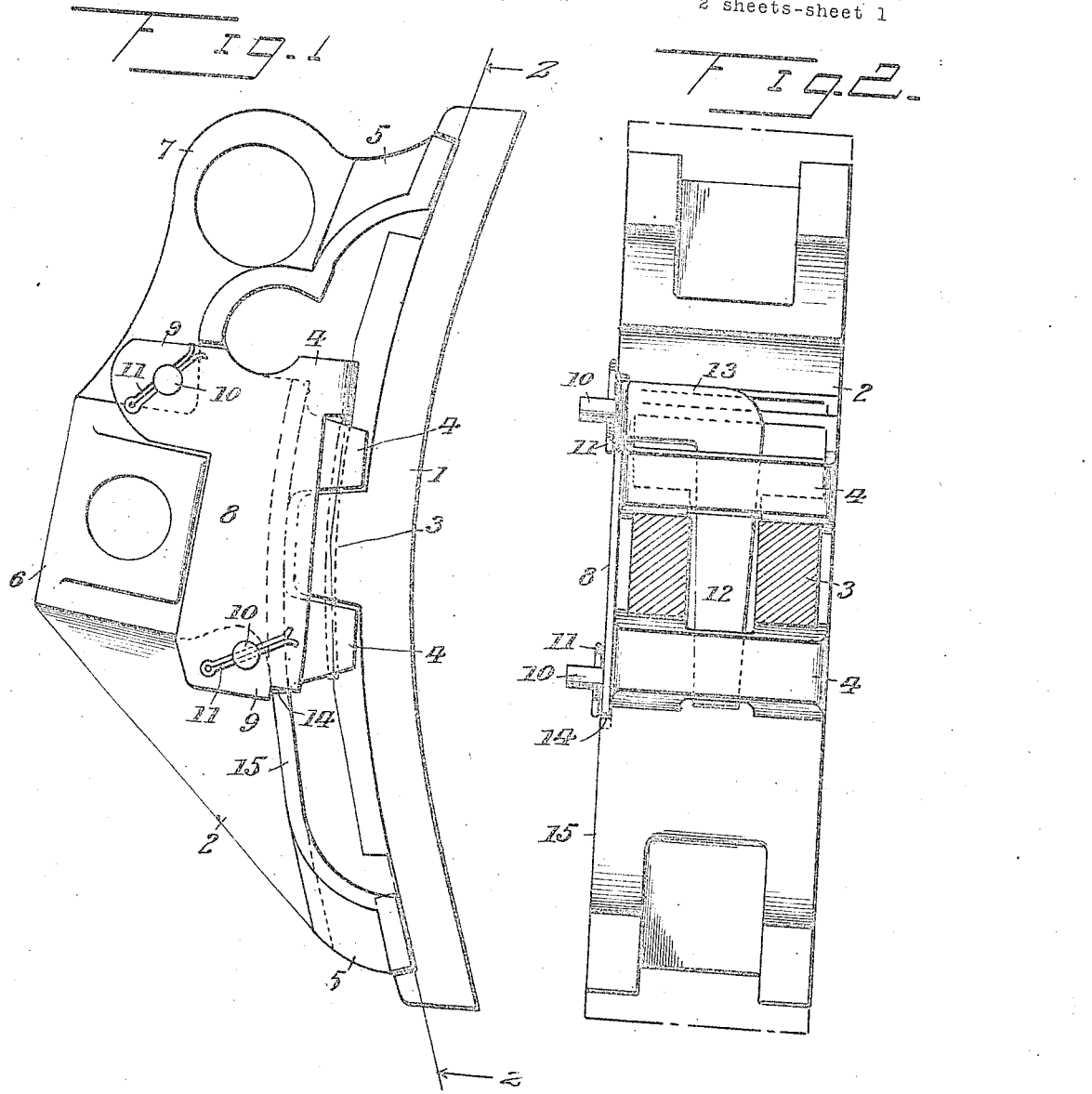

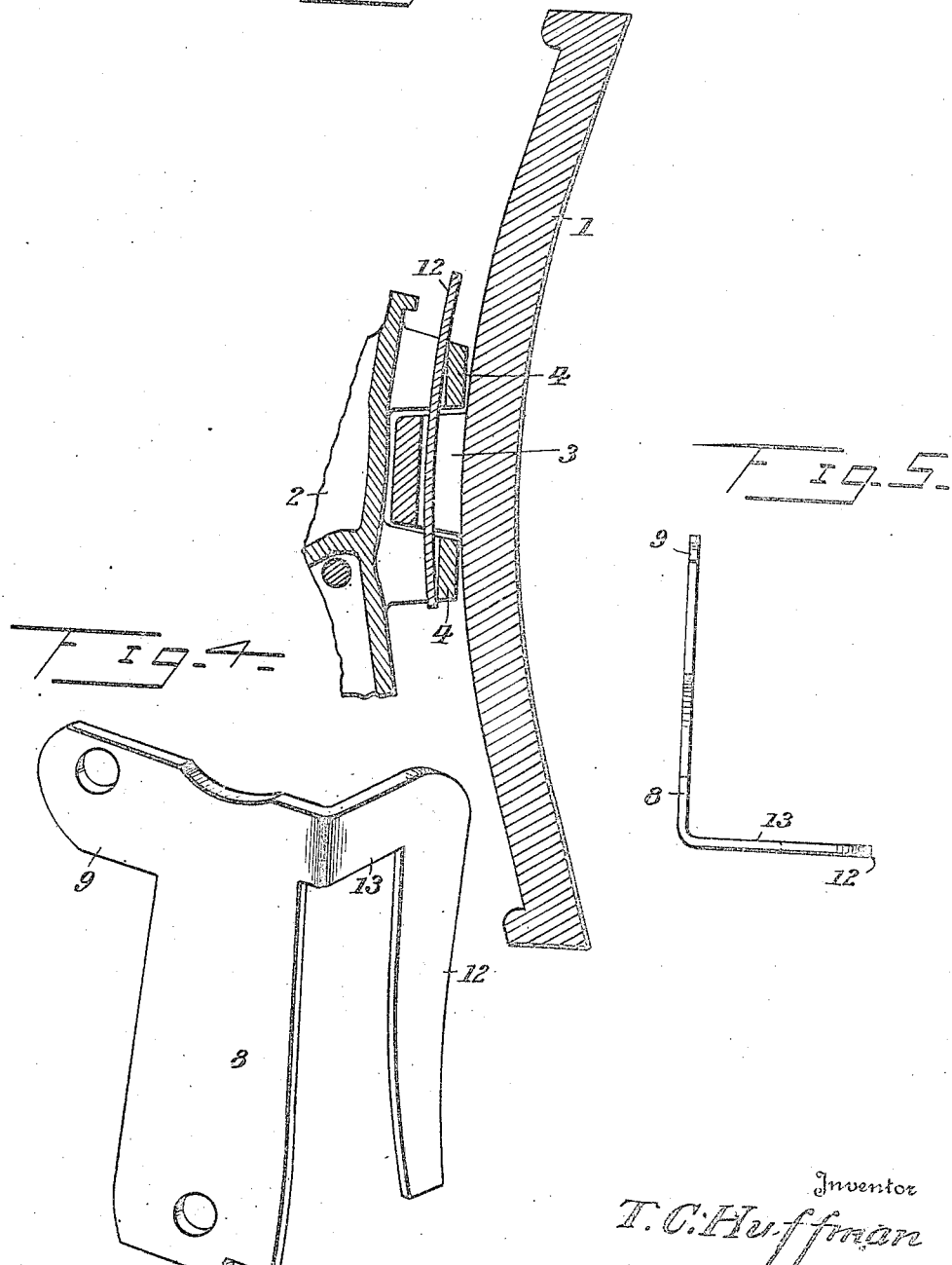

1,444,462

UNITED STATES PATENT OFFICE.

THURMAN C. HUFFMAN, OF MINOT, NORTH DAKOTA.

BRAKE SHOE AND HEAD CONNECTION.

Application filed October 11, 1921. Serial No. 507,037.

*To all whom it may concern:*

Be it known that THURMAN C. HUFFMAN, a citizen of the United States, residing at Minot, in the county of Ward and State of North Dakota, has invented certain new and useful Improvements in Brake Shoe and Head Connections, of which the following is a specification.

This invention has relation to certain new and useful improvements in a brake shoe construction for connecting the brake shoe to the head supporting the same and has for its primary object the provision of a connection of the character stated which will be applicable to the brake shoes and heads on either passenger or freight cars and which will serve to securely lock together these parts so that the brake shoe will be securely held to the head and prevented from working loose therefrom.

The invention has for another object the provision of a connection between the brake shoe and the head as stated and which includes a locking plate with the locking arm or key carried thereby so that this locking arm or key will be securely held in the interlocking or registering perforated ears of the brake shoe and head when the plate is secured upon the side of the head, thereby making it impossible for the two parts to work loose.

The invention has for another object the provision of a connection between the brake shoe and head as stated, which will be of extremely simple and inexpensive construction as well as highly efficient in use and which may be readily applied or removed, as desired.

With the foregoing and other objects in view as will appear as the description proceeds the invention consists in the novel construction, combination and arrangement of cooperating elements as hereinafter more specifically set forth, claimed and shown in the accompanying drawings forming a part of the present application and in which:—

Figure 1 is a side elevation of the brake shoe and head connected by the special connection forming the subject matter of the present invention.

Figure 2 is a sectional view on the plane of line 2—2 of Fig. 1, looking in the direction indicated by the arrows.

Figure 3 is the longitudinal vertical section at a right angle to Fig. 2 and taken through the brake shoe and a portion of the head with the locking means of the present invention in position, the remainder of the head being broken away.

Figure 4 is an enlarged detail perspective view of the locking plate and key forming the subject matter of this invention.

Figure 5 is an end elevation of the device shown in Fig. 4.

Referring more in detail to the drawings in which similar reference characters designate corresponding parts throughout the several views, 1 indicates the brake shoe and 2 the brake shoe head to which this invention is applicable, both the brake shoe 1 and the brake shoe head 2 shown in the drawings being of conventional form. The brake shoe 1 is of arcuate construction and has a central perforated lug 3 on its rear face and located about the center thereof, while the head 2 has a pair of spaced perforated lugs 4 adapted to extend on opposite sides of the lug 3. This head 2 also has a forwardly extended end portion 5 which engages the rear face of the brake shoe 1, adjacent the ends thereof, as shown clearly in Fig. 1 of the drawings. This brake shoe head 2 is also of the type carrying the central rearwardly extending side wing 6 for connection with the pivot ear of the angle plate, not shown. The head 2 further has the rearwardly extending lug 7 at its upper end for connection with the hanger, not shown, or for suitable adjustable connection with the angle plate to which the wing 6 is connected. This mounting of the head 2 is common in this art and therefore has not been shown in detail.

In order that the brake shoe 1 and head 2 may be securely connected and locked together, I have provided the side plate 8 which is of proper construction to engage one side of the head 2, as shown in the drawings and to receive in perforated extended portions 9 thereof the supporting pins or bolts 10 passed therethrough and also extending through the side of the head 2, preferably on opposite sides of the wing 6. Suitable locking members such as cotter pins 11 are passed through the extended ends of the supporting members 10, after the side plate 8 has been positioned thereon, thereby making it impossible for the plate 8 to work off of the head 2. The arm or locking key 12 is carried by and preferably formed with the plate 8 and extended parallel thereto, the arm or locking key 12 being turned at a right angle to the plate 8, as shown clearly in Figs. 4 and 5. The key or arm 12 is connected at its upper end to the upper end of the plate 8 by the turned connecting neck, as shown clearly in Fig. 4. This arm or locking key 12 is adapted to be extended through the ears 3 and 4 when the plate 8 is in proper position upon the side of the head 2, as shown in the drawings, thereby securely locking together the shoe 1 and head 2.

While the shoe and head 1 and 2 respectively may be changed slightly in construction, I have shown the plate 8 as being formed for special attachment to one side of the head 2 and shoe 1 so that the main portion of the plate 8 rests flat against the side face of the shoe head 2, with a recess 14 provided in the lower forward corner of the plate 8 and a portion of the reinforcing side flange 15 projecting from this side of the head 2 being cut away so as to permit the plate 8 to engage the side of the head 2, as stated. It is also to be noted that for this design of head 2, the rear upper corner portion 9 of the plate 8 extends opposite to the rearwardly extending side wing 6 of the head 2 and above the same. This places the plate 8 on the central portion of the shoe head 2 so as to relieve the plate 8 and the arm or locking key 12 carried thereby of unnecessary strain. The edges of the plate 8 may be rounded or cut away to permit of the usual mounting and supporting of the brake shoe head 2 and avoid interference with operation thereof when the brake is being applied or released, as will be understood by parties familiar with such devices.

It is believed that the complete construction and operation of this invention as well as the application and advantages thereof may now be readily understood without further detailed description. It is to be borne in mind that while the preferred embodiment of the invention has been shown and described, minor changes in the details of construction and arrangemet of parts may be resorted to within the scope of what is claimed without departing from the spirit of the invention.

What I claim is:—

1. A connection for a brake shoe and head comprising the combination with a brake shoe and a brake shoe head having registering perforated ears, of a plate securely fastened to one side of said head and having a locking arm parallel with and offset from said plate extending through the registering ears of said shoe and head when the plate is in position upon said head, said locking arm being connected with the plate by a turned neck portion.

2. A brake shoe and head connection comprising the combination with a brake shoe and head having registering perforated lugs, of a plate removably secured upon one side of said head and a locking key positioned at an angle with respect to said plate and engaged through the registering lugs of said shoe and head, said locking key being connected with said plate by a turned neck portion.

3. A brake shoe and head connection comprising the combination with a brake shoe having a perforated lug extended therefrom, a head having perforated lugs extended therefrom and adapted to register with said first mentioned lug, a locking plate adapted to be removably secured upon one side of said head and having a locking key adapted to extend through the registering lugs of said shoe and head, and means for securely mounting said plate on the side of said head.

4. A brake shoe and head connection comprising a plate adapted to be secured upon one face of a brake shoe head and carrying a locking key extended parallel to the body of the plate and offset therefrom, said key being connected with said plate by a neck portion extending to one end of said key and projecting from one corner portion of the said plate.

In testimony whereof I affix my signature.

THURMAN C. HUFFMAN.